United States Patent [19]

Kock et al.

[11] Patent Number: 4,475,447

[45] Date of Patent: Oct. 9, 1984

[54] SPRAY BOOTH APPARATUS

[75] Inventors: Erhard Kock, Toledo; Leo J. Zielinski, Maumee, both of Ohio

[73] Assignee: Champion Spark Plug Co., Toledo, Ohio

[21] Appl. No.: 462,054

[22] Filed: Jan. 28, 1983

Related U.S. Application Data

[63] Continuation of Ser. No. 215,184, Dec. 11, 1980, abandoned.

[51] Int. Cl.³ .............................................. B05C 15/00
[52] U.S. Cl. ................................. 98/115 SB; 55/229; 55/257 PV; 55/DIG. 46
[58] Field of Search ............ 98/115 SB; 55/227, 241, 55/257 PV, DIG. 46

[56] References Cited

U.S. PATENT DOCUMENTS

| | | | |
|---|---|---|---|
| 3,199,846 | 8/1965 | Durham et al. | 55/229 X |
| 3,664,694 | 5/1972 | Barkovitz et al. | 55/257 PV X |
| 3,699,748 | 10/1972 | Barkovitz | 55/257 PV X |
| 3,784,586 | 2/1974 | Arnold et al. | 55/227 X |
| 4,096,066 | 6/1978 | Kearney | 210/195 R |
| 4,283,999 | 8/1981 | Kearney | 98/115 SB |
| 4,295,866 | 10/1981 | Kearney | 98/115 SB |

OTHER PUBLICATIONS

"Dynaclean Spray booths", Devilbiss, Form 1-7003, p. 18.

*Primary Examiner*—Harold Joyce
*Attorney, Agent, or Firm*—Emch, Schaffer & Schaub Co.

[57] ABSTRACT

An improved water-wash spray booth of the type in which exhaust air lifts liquid from a reservoir to a trough and such lifted liquid flows from the trough over a floodsheet back to the reservoir. An open top chamber is positioned immediately below the liquid surface within the reservoir and is connected at its bottom to a conduit which discharges into the reservoir at a location spaced from the chamber. A flow of liquid from the trough above the floodsheet induces a turbulent flow of liquid from the surface of the reservoir downwardly through the chamber and out the conduit for breaking up paint particles into smaller particles.

6 Claims, 5 Drawing Figures

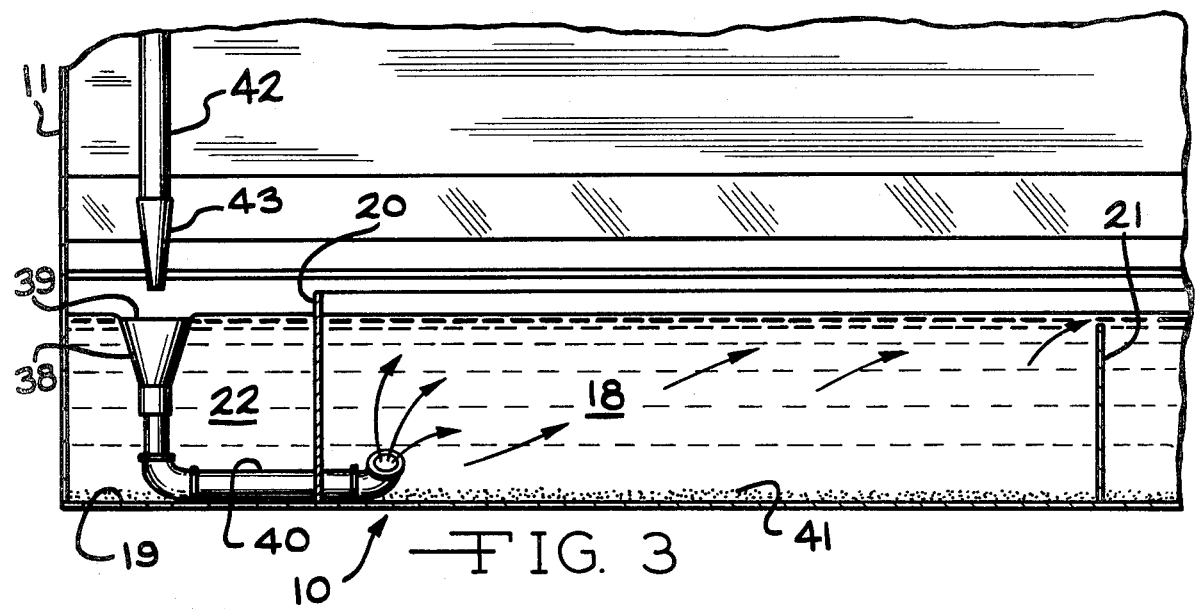
FIG. 3
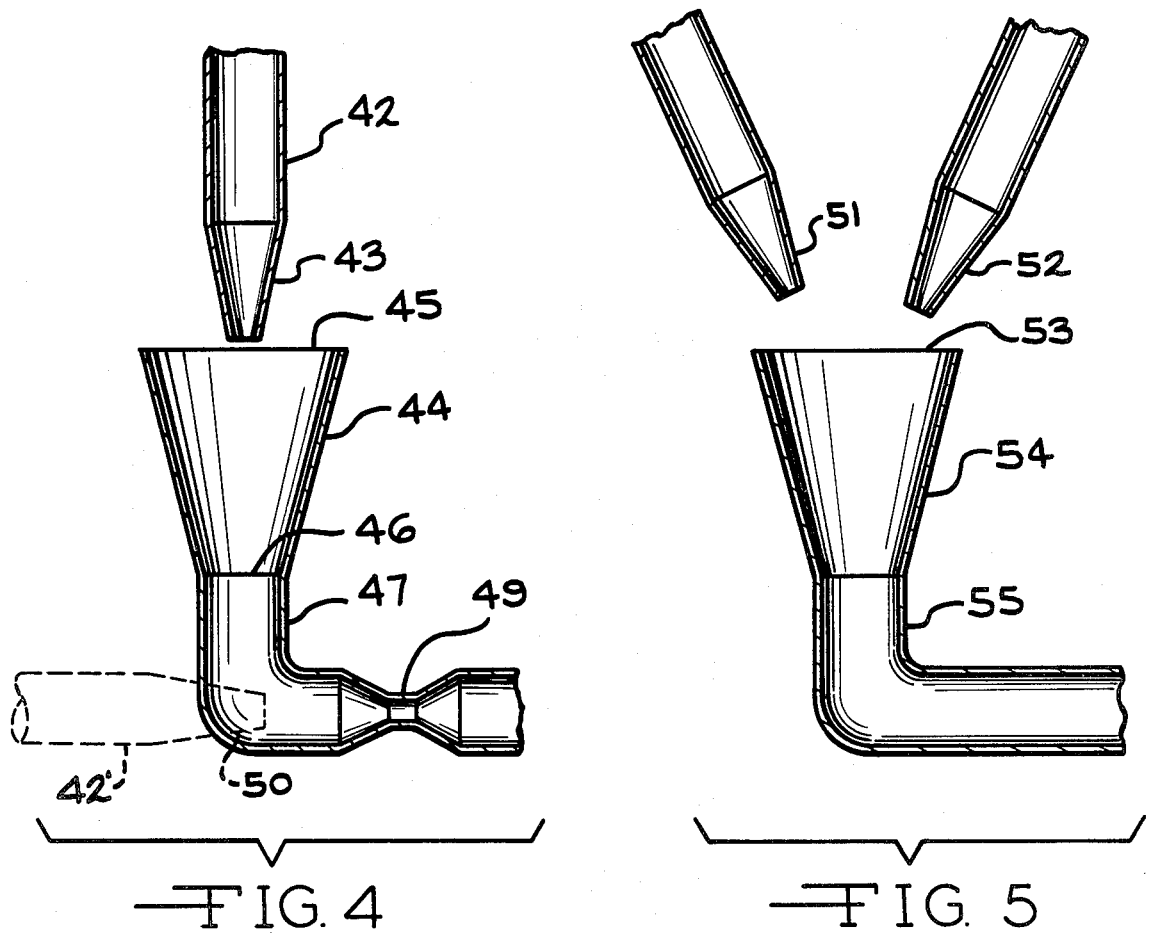
FIG. 4
FIG. 5

SPRAY BOOTH APPARATUS

This is a continuation, of application Ser. No. 215,184 filed Dec. 11, 1980 abandoned.

BACKGROUND OF THE INVENTION

The present invention relates to the separation of liquid and solid particles from a gas and more particularly to an improved spray booth for removing paint overspray from air.

Water-wash spray booths are well known in the art and generally comprise a water curtain flowing over a so-called floodsheet against which overspray from one or more spray guns is directed. The overspray mingles with the water flowing over the floodsheet and is collected in a reservoir. Many spray booths rely on a pump for the supply of water to the water curtain, although recently many "pumpless" booths have become known in the art. These booths rely on a very high velocity exhaust air stream to pick up water from the reservoir and to mingle it with the overspray. The entrained water is separated from the exhaust air prior to discharge of the cleansed air by the exhaust fan. The separated water is used to maintain the floodsheet. Early booths of this type require considerable maintenance since the paint laden water is continuously recirculated through the system and also because there is a tendency for the paint to float as a foam on the surface in the reservoir.

In an improved water-wash spray booth, as described in Kearney U.S. Pat. No. 4,096,966, water flows from the floodsheet into a main reservoir or holding tank. An opened top cone or chamber, sometimes referred to as a Dehon cone, is positioned immediately below the surface level within the reservoir. A pump continuously draws liquid from the reservoir and causes a high velocity stream of such liquid to flow through a venturi and back into the reservoir. Through this arrangement, both foamed paint particles floating on the surface of the reservoir and paint particles suspended within the liquid are drawn into the chamber and forced through the venturi back into the reservoir. This device breaks up the paint particles into very small particles which more easily separate solvent from paint solids so that the solids can eventually settle as a dense mat on the bottom of the reservoir. This system has greatly reduced the volume of paint waste disposal from the spray booth and also has reduced maintenance on the spray booth. However, periodic maintenance still is required on the pump which circulates liquid from the reservoir through the Dehon cone or chamber and through the venturi back to the reservoir.

SUMMARY OF THE INVENTION

According to the present invention, an improved waterwash spray booth is provided for collecting paint overspray and for separating such overspray from exhaust air drawn through the spray booth. Paint overspray is directed towards a floodsheet over which a curtain of water flows. The water curtain and paint collected in the water fall into a reservoir. An exhaust fan draws air around the floodsheet and into an upwardly directed entrainment duct. Along with such air, liquid particles are drawn from the surface of the reservoir upwardly through the duct. The air and entrained liquid are drawn through a liquid separator which separates the liquid including any entrained paint particles from the air and allows the dry air to be exhausted. The separated liquid flows to a trough and thence overflows an edge of the trough and flows downwardly over the floodsheet to form the water curtain. The reservoir which receives the paint laden water from the floodsheet is divided into at least two regions. The paint laden water from the floodsheet is collected in the first and second regions. The liquid in the first region flows to the second region and finally is drawn up through the entrainment ducts and recirculated through the spray booth.

An upwardly opening chamber or Dehon cone is positioned within the second reservoir region and has a bottom opening which is connected to a conduit which discharges into the first reservoir region below the liquid surface. In addition to forming a water curtain over the floodsheet, water supplied to the trough above the floodsheet flows down a pipe to a downwardly directed nozzle positioned above surface level within the reservoir. The nozzle is positioned above and directs a water jet towards the bottom outlet of the chamber or Dehon cone to induce a flow of liquid from the surface of the second reservoir region downwardly through the chamber or cone, through the conduit and into the first reservoir region. The flow of liquid from the surface of the second reservoir region downwardly through the chamber or cone and through the conduit back to the first region is turbulent and breaks up the paint particles within the reservoir to allow the solids in such paint particles to settle to the bottom of the reservoir, forming a dense blanket. If desired, a modification may be made by incorporating a venturi within the conduit connecting the chamber or Dehon cone with the first reservoir region. By using a donwwardly directed flow of water from the trough to induce a flow of liquid from the surface of the reservoir downwardly through the chamber or cone, the need for a pump for producing such a liquid flow is eliminated. Consequently, maintenance required on the spray booth is greatly reduced over that required in prior art spray booths having liquid pumps since the only moving element within the spray booth is the exhaust fan which contacts the exhaust air from which moisture and paint have been removed.

Accordingly, it is an object of the invention to provide an improved water-wash spray booth.

Another object of the invention is to provide an improved water-wash spray booth which requires no liquid pump for operation.

Other objects and advantages of the invention will become apparent from the following detailed description, with reference being made to the accompanying drawings.

BRIEF DESCRIPTION OF THE DRAWINGS

FIG. 3 is a cross-sectional view taken along lines 3—3 of FIG. 1;

FIG. 4 is a fragmentary cross-sectional elevational view showing a modified nozzle and chamber for inducing a liquid flow to break up paint particles within the reservoir of the spray booth of the present invention; and FIG. 5 is a fragmentary cross-sectional elevational view showing a further modified chamber and nozzle for inducing a liquid flow to break up paint particles within the reservoir of the spray booth of the present invention.

DESCRIPTION OF THE PREFERRED EMBODIMENT

Figure 1:
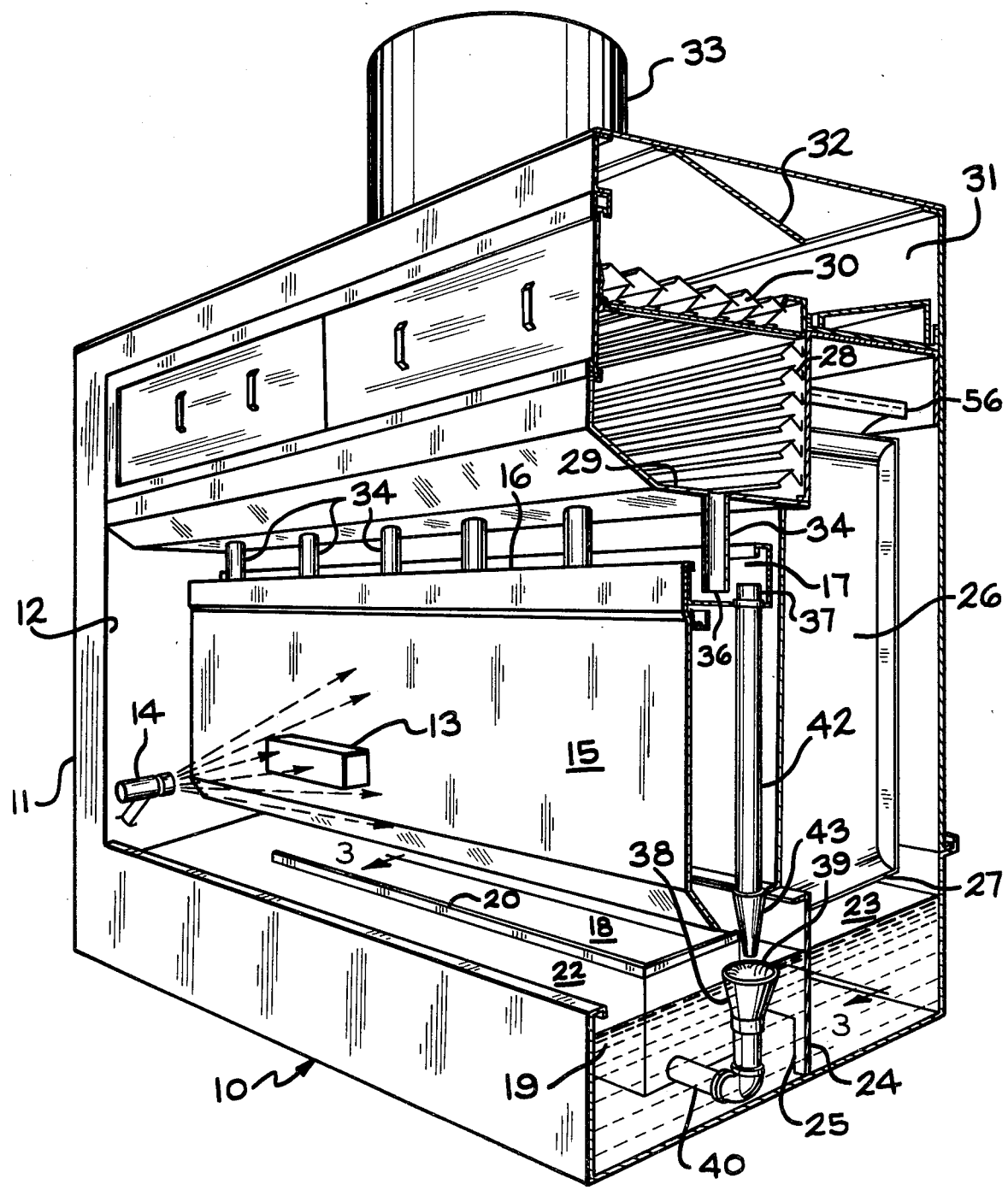
FIG. 1 is a fragmentary perspective view of a paint spray booth constructed in accordance with the present invention.
Figure 2:
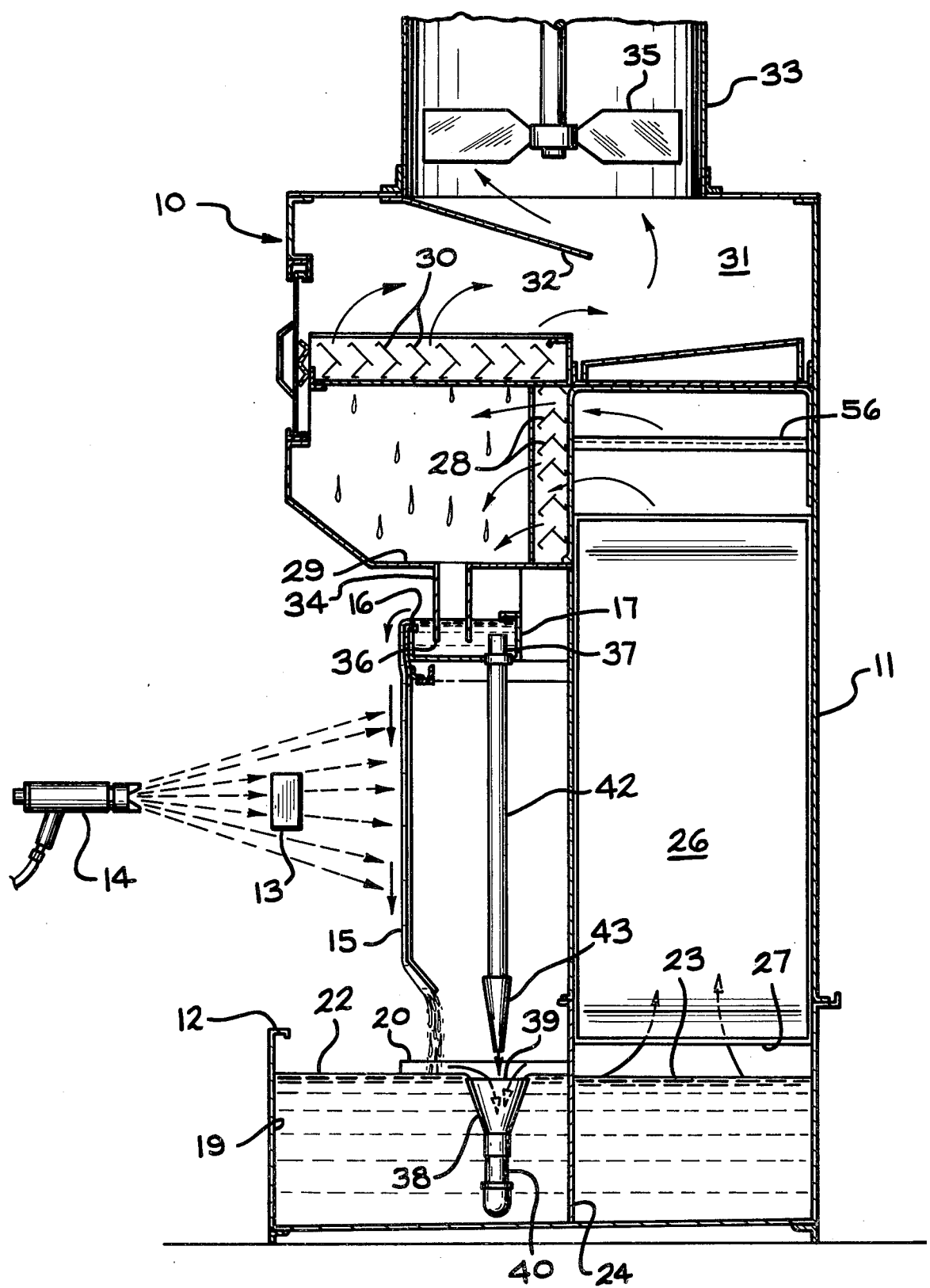
FIG. 2 is a cross-sectional elevational view taken through the spray booth of FIG. 1.

Turning now to the drawings and particularly to FIGS. 1-3, a fragmentary portion of a water-wash spray booth 10 constructed in accordance with the present invention is illustrated. The spray booth 10 includes a body or housing 11 defining a side opening 12. A workpiece 13 to be sprayed with paint from a spray gun 14 is positioned in front of the side opening 12 so that overspray is directed at a floodsheet 15. The floodsheet 15 is positioned below an upper edge 16 on a trough 17. The edge 16 is horizontally disposed so that a continuous flow of water supplied to the trough 17 uniformally flows over the edge 16 and cascades as a water curtain down the surface of the floodsheet 15. Water flowing from the floodsheet 15 falls into a first region 18 and a second region 22 of a reservoir 19 defined by the lower part of the housing 11. From the first reservoir region 18, the collected paint and water flow around a partition 20 and over one or more submerged baffles 21 to the second reservoir region 22. As will be described hereinafter, the solids from a majority of the paint accumulated in the reservoir 19 settle within the first region 18.

The reservoir 19 includes a third region 23 separated from the first and second regions 18 and 22 by a baffle 24. A submerged opening 25 in the baffle 24 connects the second reservoir region 22 with the third reservoir region 23. The submerged opening 25 allows water to flow from the second region 22 to the third region 23 while the baffle 24 confines floating paint to the first and second regions 18 and 22.

Room air along with any paint overspray which does not strike the workpiece 13 or the floodsheet 15 is drawn around the periphery of the floodsheet 15 into a back portion of the housing 11. From here, the air and entrained paint are drawn verticaly upwardly through an entrainment duct 26. Th entrainment duct has a lower opening 27 spaced just above the liquid surface in the third reservoir region 23. The velocity of the air drawn into the duct 26 through the opening 27 is sufficiently high so as to entrain a great volume of liquid from the reservoir surface and mingle such entrained liquid with the uprushing air stream. Preferably, several of the entrainment ducts 26 are spaced across the back of the spray booth housing 11. At the top of each entrainment duct 26, the liquid laden air is diverted laterally by a splitter assembly 56 and then proceeds through a series of baffles 28. The air is forced to rapidly change direction and decrease in velocity at these points so that a significant quantity of the entrained liquid falls from the air stream into a sump 29. A second series of baffles 30 cause a further rapid change in the direction of air flow as the air is drawn into plenum chamber 31. The baffles 28 and 30 which cause rapid changes in the air flow direction function as a liquid eliminator for removing the entrained liquid from the exhaust air. From the plenum chamber 31, the dry air is drawn over a perforated baffle plate 32 and is drawn upwardly through a exhaust 33 by a suitable fan 35 or blower located within the exhaust 33.

As the liquid laden air is drawn through the baffles 28 and 30 for extracting water and paint particles from such air, the liquid settles into the sump 29. From the sump 29, the liquid passes downwardly through drain pipes 34 which lead to the trough 17. A sufficient water flow passes through the drain pipes 34 to the trough 17 so as to maintain the water curtain over the floodsheet 15. The drain pipes 34 extend below the lip or edge 16 of the trough 17 so that the bottom 36 of the drain pipes are always below the surface level of liquid in the trough 17. This prevents the fan 25 from drawing air upwardly through the drain pipes 33.

In accordance with the present invention, a chamber 38 is located within the second reservoir region 22. The chamber 38 preferbly is in the shape of an inverted cone and has an upper opening 39 located just below the liquid surface level within the reservoir 19. A conduit 40 connects to the bottom of the chamber 38 and leads through the partition 20 into the first reservoir region 18 at a point spaced below the liquid surface. The chamber 38 functions in a manner similar to that described in the above mentioned Kearney U.S. Pat. No. 4,096,066. Reservoir liquid and paint floating on the surface of liquid in the reservoir 19 are drawn into the upper end of the chamber 38 and turbulently caused to flow downwardly and through the conduit 40. The turbulent flow breaks up the paint particles into smaller particles and disperses such particles into the first reservoir region 18. As the paint particles break up into smaller particles, solvent separates from the paint solids and the paint solids settle to the bottom of the reservoir 19 and form a dense mat 41. By removing the floating paint particles from the surface of the liquid in the reservoir 19 and causing such particles along with larger paint particles dispersed in the reservoir liquids to settle as a dense mat on the bottom of the reservoir 19, maintenance of the spray booth 10 is greatly reduced.

In accordance with the present invention, the flow of liquid including floating paint particles and larger dispersed paint particles within the reservoir 19 is induced downwardly through the chamber 38 by means of a liquid jet. The liquid jet is produced from liquid flowing from the trough 17 through a standpipe 37 and a down pipe or jet pipe 42. The standpipe 37 extends above the level of the bottoms 36 of the drain pipes 34 and below the lip or edge 16 of the trough 17 so that liquid will flow from the trough 17 into the standpipes 37. However, the standpipe 37 will not lower the liquid level in the trough 17 below the bottoms 36 of the drain pipes 34 so air cannot be drawn into the drain pipes 34. The down pipe 42 connects from the standpipe 37 in the trough 17 to a downwardly directed nozzle 43. The nozzle 43 is located above the chamber 38 and is positioned to direct a high velocity stream of liquid through the upper chamber opening 39 towards the inlet to the conduit 40. The downward flow of liquid into the chamber 38 induces a flow of liquid from the liquid surface within the reservoir region 22 downwardly through the chamber 38 and the conduit 40 and into the reservoir region 18. The liquid jet also induces a high turbulence in the liquid flow through the conduit 40 to facilitate breaking up the paint particles drawn downwardly from the reservoir surface through the chamber 38 and the conduit 40 and ejected into the reservoir region 18. As the paint particles are broken up into smaller particles, the solvent in the paint is more readily stripped from the solids, thereby allowing the heavier solids to settle out in the first reservoir region 18 to form the mat 41. Consequently, very few suspended solids remain in the liquid flowing into the third reservoir region 23 which is drawn upwardly through the entrainment ducts 26 and supplied to the trough 17. Since the liquid is circulated through the spray booth 10 without the use of a liquid pump and also since a liquid pump is not required for causing a flow of surface liquid in the reservoir 19 through the chamber 38, maintenance on the spray booth 10 is greatly reduced over prior art spray booths which require the use of a pump for circulating liquids through a chamber such as the chamber 38. Turning now to FIG. 4, a modified device using a Dehon cone 44 is illustrated for use in the spray booth 10. The Dehon cone 44 has an upper opening 45 which is positioned immediately below the liquid surface level within the spray booth reservoir. The Dehon cone 44 also has a lower outlet 46 connected to a conduit 47 for discharging fluid into a lower region of the reservoir. The nozzle 43 is positioned immediately above the liquid surface level within the reservoir for directing a liquid jet from the trough (trough 17 in FIGS. 1 and 2) into the cone 44 for inducing a flow of surface liquid from the reservoir through the conduit 47. A venturi 49 is located within the conduit 47. The venturi 49 increases the flow velocity and may help establish turbulence within the conduit 47. In a further modification, the nozzle 43 may be replaced by or supplemented with a nozzle 50 connected to a down pipe 42' (shown in dashed lines) for extending into the conduit 47 and directing a liquid jet towards a conduit outlet (not shown) for inducing a flow of liquid from the reservoir surface downwardly through the cone 44 and through the conduit 47. Again, the liquid jet emanating from the nozzle 50 is formed from liquid flowing from the trough 17 (FIGS. 1 and 2) and through the down pipe 42' without the use of a separate pump for causing a liquid flow through the cone 44.

Still a further modified structure is shown in FIG. 5 in which two nozzles 51 and 52 are positioned above the upper opening 53 of a Dehon cone 54 for directing fluid jets downwardly through the cone 54 towards a conduit 55. The nozzles 51 and 52 may be connected to separate down pipes from the liquid trough located above a floodsheet in a spray booth.

It will be appreciated that various modifications and changes may be made in the above described spray booth. In accordance with the present invention, a pumpless waterwash spray booth of known design is provided with a chamber located within and immediately below the surface of a liquid reservoir. A flow of liquid induces a downward flow of liquid from the reservoir surface through the chamber for breaking up paint particles within the reservoir so that they may settle to the bottom of the reservoir. The flow of water is achieved without the use of a mechanical pump.

What we claim is:

1. A paint spray booth comprising a wall, reservoir means for holding a liquid having first and second regions with said first region located below said wall, a trough positioned above said wall, said trough being elevated a predetermined distance above said reservoir means, blower means for drawing a continuous flow of air and liquid positioned above said trough, separating means in communication with said blower means for supplying liquid to said trough, such liquid flowing from said trough as a curtain over said wall for entraining paint overspray, said first region of said first reservoir means receiving such liquid curtain and entrained paint overspray, such received liquid and paint overspray flowing from said first reservoir region to said second reservoir region, means for transporting surface liquid and paint overspray from said second reservoir region including a venturi chamber having an upper opening disposed immediately below the liquid surface in said second reservoir region and having a bottom opening smaller than said upper opening, conduit means connecting said bottom opening with said first reservoir region, and jet pipe means extending from said trough to a position adjacent said venturi chamber for injecting liquid received from said trough into said venturi chamber, said liquid being subjected to a pressure resulting from said trough being elevated such predetermined distance above said reservoir, whereby said liquid under pressure is injected into said venturi chamber by said jet pipe inducing a turbulent flow of liquid from the surface of said second reservoir region through said venturi chamber and through said conduit means to said first reservoir region, such high turbulence in said venturi chamber being induced by the pressure jet of liquid resulting from the predetermined distance between said trough and said reservoir means and the resultant pressure head at the bottom of said jet pipe means.

2. A paint spray booth, as set forth in claim 1, wherein said chamber has the shape of a funnel.

3. A paint spray booth, as set forth in claim 2, wherein said jet pipe means includes a nozzle spaced above the reservoir liquid surface above said funnel-shaped member, said nozzle directing a jet of liquid from said trough downwardly into the interior of said funnel-shaped chamber towards said conduit means whereby liquid discharged from said nozzle causes a turbulent flow of liquid from the reservoir surface downwardly through said funnel-shaped chamber into said conduit means.

4. A paint spray booth, as set forth in claims 1 or 3, wherein said blower means further exhausts air from said spray booth, said blower means drawing such exhaust air having entrained liquid upwardly from the surface of said reservoir means, above said trough for separating such entrained liquid from such exhaust air, and gravity operated means for supplying such separated liquid to said trough.

5. A paint spray booth, as set forth in claim 4, wherein said gravity operated means comprises at least one drain pipe carrying such separated liquid from said separating means to a predetermined location in said trough below the liquid surface level in said trough, and wherein said jet pipe means further includes a stand pipe means for supplying a flow of liquid from said trough through said jet pipe means toward said venturi chamber.

6. An improved paint spray booth, as set forth in claim 1, wherein said jet pipe means includes a nozzle having an opening located to discharge a flow of liquid from said trough directly into said conduit means for inducing a turbulent flow of liquid from the reservoir surface downwardly through said venturi chamber and into said conduit means.

* * * * *